United States Patent Office 3,052,602
Patented Sept. 4, 1962

3,052,602
METHOD AND COMPOSITION FOR THE CONTROL OF COCCIDIOSIS IN ANIMALS
Theo Alfred Hymas and Graham Thomas Stevenson, Midland, Mich., assignors to The Dow Chemical Company, Midland, Mich., a corporation of Delaware
No Drawing. Filed Oct. 1, 1956, Ser. No. 612,917
9 Claims. (Cl. 167—53.1)

This invention relates to animal husbandry and more particularly to a method and composition for the control of gastro-intestinal parasites in animals and for improving the efficiency of the utilization of animal feed.

Domestic animals are subject to attack by various types of gastro-intestinal parasites. Certain of these parasites are minute protozoan organisms known as coccidia. These protozoan organisms are the causative agents of coccidiosis which is a widespread and destructive disease of chickens, ducks, pigeons, geese and turkeys. The disease is also found in pigs, dogs, lambs, calves and other domesticated animals.

The coccidia invade and multiply in various organs of their host but particularly in the gastro-intestinal tract. During the process of growth and multiplication they erode the epithelial tissue of the cecum and intestines bringing about anemia, weakness, hemorrhage, digestive disturbances and intestinal necrosis. If the animals do not die from the infection, they are often rendered economically valueless by chronic forms of the disease.

Several remedies have been suggested for the control of these gastro-intestinal parasites. These remedies are generally administered through the water or feed of the animals. Many of these materials are inefficient while others are too expensive or too toxic for prophylactic administration. One difficulty encountered with materials used in the past has been the adverse effect which some of these materials have had upon growth, reproduction and fertility. Another difficulty has been the poisoning of the blood-forming organs by some of these remedies and a drastic reduction in the number of red and white blood cells in the body. A further difficulty has been the inability of many materials to control more than one species of coccidia or to control the various strains of coccidia within one species. These effects have made the use of many remedies hazardous and unprofitable.

It is an object of the present invention to provide a new and improved practice for raising and benefiting animals and fowl. A further object is to provide a new and improved method for the control of gastro-intestinal parasites in animals. An additional object is the provision of a method of improving the utilization of feed by animals. Another object is to provide a novel method for the control of coccidiosis in infected animals. Still another object is to provide a method which may be employed prophylactically to control parasitic diseases of the gastro-intestinal tract of animals without adversely affecting the metabolic activity, reproduction, or the blood-forming organs of animals so treated. A further object is to provide novel feed compositions adapted to be employed in the new methods in animal husbandry. Other objects will appear throughout the following specification and appended claims.

The new method comprises administering to animals a polynitrobenzamide compound having the formula $$Z-\overset{O}{\underset{\|}{C}}-R$$

wherein R represents a radical selected from the group consisting of amino, monomethylamino, dimethylamino, monoethylamino, diethylamino, propylamino, dipropylamino, allylamino, hydroxyethylamino, hydroxypropylamino, methoxyethylamino, and methoxypropylamino and Z represents a substituted phenyl radical selected from the group consisting of

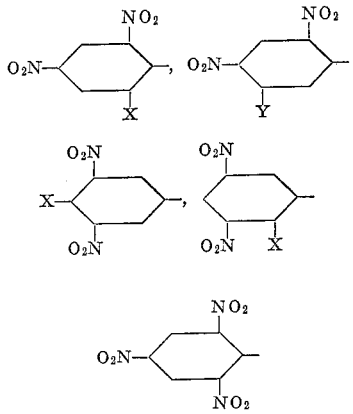

and

in which X represents a member of the group consisting of hydrogen, amino, lower alkoxy and lower alkyl and Y represents a member of the group consisting of hydrogen, lower alkoxy and lower alkyl. In the present specification and claims the expressions "lower alkoxy" and "lower alkyl" refer to the alkoxy and alkyl radicals containing from 1 to 3 carbon atoms, inclusive. Such practice improves the efficiency of the utilization of feed by animals and protects the animals from parasitic diseases of the gastro-intestinal tract and particularly from coccidiosis. Further, the practice protects the animals from many strains of *Eimeria tenella* coccidia. Also, while protecting the animals from coccidiosis, the practice allows the protected animals exposed to the coccidial infection to develop acquired immunity to the disease. The polynitrobenzamide compounds are crystalline solids and inexpensive to prepare. They are not repellent to animals and may be employed in admixture with animal feed. They may be administered continuously or intermittently in dosages sufficient to improve feed efficiency and to control gastro-intestinal parasites in infected animals without adversely affecting the metabolic activity, reproduction or the blood-forming organs of the fowl, or without imparting any unpalatable characteristics to animal flesh.

The oral administration or feeding of an effective dosage of the polynitrobenzamide compounds is essential and critical for the practice of the present invention. In general, good results are obtained when the animals are fed a daily dosage of from 3 to 2,000 milligrams of the polynitrobenzamide compounds per kilogram of body weight. Where prophylactic treatment for the control of gastro-intestinal parasites is desired and the compounds are fed continuously, daily oral dosages of from 3 to 250 milligrams per kilogram of body weight have been found to be satisfactory. Where danger of reinfestation from contaminated feed or surroundings is low, good controls are obtained when the infected animals are fed a daily dosage of 35 milligrams or more per kilogram of body weight for a period of from 2 to 5 days.

The method of the present invention may be carried out by the oral administration or feeding of the unmodified polynitrobenzamide compounds. However, the present invention also embraces the employment of a liquid, powder, mash, pellet or other animal feed composition containing said compounds. In such usage, the compounds may be modified with one or more of a plurality of additaments or innocuous ingestible adjuvants including water, ethanol, skim milk, edible oils, syrups, surface active dispersing agents such as the liquid and solid emulsifying agents, and edible solid carriers such as edible powders and commercial animal feeds, concentrates or supplements. By commercial animal feeds, concentrates or supplements are meant the partial and complete animal feeds containing desirable amounts of minerals, vitamins, antioxidants, antibiotics and growth stimulants. Such compositions are adapted to be fed to animals to supply the desired dosage of active agent or to be employed as concentrates and subsequently diluted with additional carrier to produce the ultimate compositions. The exact concentration of the polynitrobenzamide compounds to be employed in the compositions may vary provided that enough of the composition is ingested by the animal so as to provide the required internal dosage of active ingredient. For example, where direct administration to the individual animal is preferred, liquid or solid compositions containing from 5 to 95 percent by weight of the agents may be employed to supply the desired dosage. Where the compounds are provided as a constituent of the principal food ration, satisfactory results are obtained with food rations containing a minor but effective amount of the polynitrobenzamide compounds. The exact amounts of the compounds in the ration are dependent upon the food consumption and feeding habits of the animal concerned. In fowl the required dosages may be supplied with mash compositions containing from 0.001 to 0.1 percent by weight of the active agents. In pigs, the required dosage may be supplied with mash compositions containing from 0.001 to 0.1 percent by weight of active material when fed as the principal food ration. Where the compounds are furnished in the drinking water, good results are obtained at concentrations of the agents in the water equal to one-half those employed when the compounds are supplied as a constituent in the principal food ration. In compositions to be employed as concentrates, the active agents may be present in a concentration of from 5 to 95 percent by weight.

Liquid compositions containing the desired amount of the polynitrobenzamide compounds may be prepared by dissolving the compounds in ethanol, propylene glycol, or an edible oil or by dispersing them in water with the aid of a suitable surface active dispersing agent such as an ionic or non-ionic emulsifying agent. Suitable surface active dispersing agents include the glycerol and sorbitan esters of fatty acids and the polyoxyalkylene derivatives of fatty alcohols and of sorbitan esters. The aqueous compositions may contain one or more water immiscible oils as a solvent for the active agent. In such compositions the water, oil and emulsifying agent constitute an aqueous emulsion carrier.

In the preparation of solid feed compositions, the polynitrobenzamide compounds may be mechanically ground with an edible solid such as oyster shell flour or a solid, surface active, dispersing agent such as finely divided bentonite, fuller's earth or talc. These compositions may be administered in the form of capsules or tablets or dispersed in an animal feed and such feed used to supply a part or all of the ration. Alternatively, the polynitrobenzamide compounds may be dissolved in an organic solvent such as alcohol or acetone and the resulting mixture dispersed in an animal feed which is then dried to remove the solvent. The compounds may also be dispersed in an edible oil such as coconut, olive, cotton seed or peanut oil and the resulting mixtures dispersed in the feed. These edible oil compositions may contain one of the aforementioned emulsifying materials as a dispersing agent.

The following examples illustrate the invention but are not to be construed as limiting:

*Example 1*

Twenty-five parts by weight of various 3,5-dinitro-2-methylbenzamides were separately ground with 75 parts of fuller's earth to prepare compositions adapted to be fed to animals or employed as dispersible concentrates. Each such composition contained only one 3,5-dinitro-2-methylbenzamide compound. A portion of each of these compositions was dispersed in a commercial poultry starting mash to produce medicated feed compositions containing various amounts of one of the benzamide compounds.

Portions of these medicated feed compositions and unmodified starting mash were fed as a sole ration to groups of chickens of the same history. Each such test group consisted of 15 white Leghorn chicks which were seventeen days old. Twenty-four hours after the initiation of the diets, 40,000 sporulated *Eimeria necatrix* oöcysts were introduced directly into the crops of the birds. At the time of the initiation of the diets and from the fourth through the tenth day thereafter, the birds were weighed and the average weight per bird for each test group determined. During the interval between the fifth and seventh days, the coccidial infection generally causes maximum disturbances in the rate of growth. Another group of birds was left untreated and uninoculated to serve as an uninfected check. Any birds which died were autopsied and the cause of death determined. The average weights per bird at the aforementioned intervals and the mortality figures for each test group are shown in the following table.

| 2-Methyl-Benzamide Agent Employed | Percent by Weight of Active Agent | Average Weight Per Bird in Grams on Day Indicated After Diet Began | | | | | | | | Percent Mortality From Coccidiosis |
|---|---|---|---|---|---|---|---|---|---|---|
| | | 0 | 4 | 5 | 6 | 7 | 8 | 9 | 10 | |
| 3,5-Dinitro- | 0.01 | 114 | 158 | 170 | 185 | 197 | 207 | 223 | 238 | 0 |
| | 0.02 | 114 | 157 | 169 | 183 | 194 | 205 | 221 | 234 | 0 |
| N-Methyl-3,5-Dinitro- | 0.01 | 115 | 159 | 170 | 184 | 194 | 203 | 219 | 231 | 0 |
| | 0.02 | 116 | 160 | 172 | 187 | 194 | 204 | 219 | 232 | 0 |
| N,N-Dimethyl-3,5-Dinitro- | 0.01 | 114 | 157 | 169 | 183 | 191 | 202 | 218 | 231 | 0 |
| | 0.02 | 115 | 155 | 167 | 181 | 193 | 204 | 221 | 234 | 0 |
| N-Ethyl-3,5-Dinitro- | 0.01 | 114 | 155 | 168 | 181 | 188 | 195 | 214 | 224 | 0 |
| | 0.02 | 115 | 159 | 170 | 187 | 197 | 208 | 226 | 239 | 0 |
| N,N-Diethyl-3,5-Dinitro- | 0.01 | 114 | 156 | 170 | 182 | 188 | 197 | 216 | 235 | 0 |
| | 0.02 | 114 | 154 | 168 | 182 | 193 | 202 | 219 | 232 | 0 |
| N-(2-Methoxy-ethyl)-3,5-Dinitro- | 0.02 | 114 | 155 | 168 | 181 | 183 | 196 | 215 | 224 | 0 |
| N-(2-Hydroxy-propyl)-3,5-Dinitro- | 0.02 | 115 | 156 | 171 | 185 | 194 | 205 | 223 | 236 | 0 |
| N-(2-Hydroxyethyl)-3,5-Dinitro- | 0.02 | 114 | 152 | 165 | 176 | 179 | 185 | 203 | 212 | 0 |
| Infected Checks | | 115 | 156 | 165 | 156 | 150 | 137 | 146 | 161 | 33 |
| Uninfected Checks | | 115 | 158 | 171 | 183 | 196 | 206 | 218 | 231 | 0 |

*Example 2*

Twenty-five parts by weight of various 3,5-dinitrobenzamides were separately ground with 75 parts of bentonite to prepare compositions adapted to be fed to animals or employed as dispersible concentrates. Each such composition contained only one benzamide compound. A portion of each of these compositions was dispersed in a commercial poultry starting mash to produce medicated feed compositions containing 0.015 percent by weight of one of the benzamide compounds.

These medicated feed compositions and unmodified starting mash were fed as a sole ration to groups of chickens of the same history. Each such test group consisted of 15 white Leghorn chicks which were seventeen days old. Twenty-four hours after the initiation of the diets, 35,000 sporulated *Eimeria necatrix* oöcysts were introduced directly into the crop of each bird. Following the inoculation the birds were observed for ten days for mortality due to coccidial infection. During this period, coccidial infection generally causes the greater proportion of mortalities. Another group of birds was left untreated and uninoculated to serve as an uninfected check. All birds which died were autopsied and the cause of death determined. The percent mortality figures for each test group are set forth in the following table.

| Benzamide Agent Employed | Percent Mortality From Coccidiosis |
|---|---|
| N,N-Dimethyl, 3,5-Dinitro- | 0 |
| 2-Amino-3, 5-Dinitro- | 0 |
| N-Methyl-3, 5-Dinitro- | 0 |
| Infected Check | 33 |
| Uninfected Check | 0 |

*Example 3*

Portions of the concentrate compositions as prepared in Example 1 were dispersed in chicken mash to prepare medicated feed compositions containing 0.02 percent by weight of one of the 3,5-dinitro-2-methylbenzamide compounds. These medicated feed compositions were tested with unmodified mash in a manner similar to that described in Example 1. In such operations, each test group consisted of 15 birds and the birds were inoculated with 50,000 sporulated *Eimeria tenella* oöcysts. The average weight per bird and the percent mortality from coccidiosis in each test group are set forth in the following table.

| 2-Methylbenzamide Agent Employed | Average Weight Per Bird in Grams on Days Indicated After Diet Began | | | | | | | | Percent Mortality From Coccidiosis |
|---|---|---|---|---|---|---|---|---|---|
| | 0 | 4 | 5 | 6 | 7 | 8 | 9 | 10 | |
| 3,5-Dinitro- | 136 | 181 | 195 | 206 | 213 | 228 | 242 | 254 | 0 |
| N-Methyl-3,5-Dinitro- | 136 | 183 | 199 | 211 | 217 | 228 | 243 | 258 | 0 |
| N,N-Dimethyl-3,5-Dinitro- | 137 | 184 | 200 | 211 | 216 | 232 | 248 | 263 | 0 |
| Infected Control | 136 | 176 | 202 | 196 | 184 | 185 | 194 | 208 | 20 |
| Uninfected Control | 136 | 184 | 198 | 211 | 220 | 235 | 253 | 269 | 0 |

*Example 4*

A portion of the concentrate composition containing 25 percent by weight of 3,5-dinitro-2-methylbenzamide as prepared in Example 1 was dispersed in commercial poultry mash to prepare medicated feed compositions containing 0.0125 percent and 0.015 percent of 3,5-dinitro-2-methylbenzamide. These compositions and unmodified mash were fed as a sole food ration to groups of white Leghorn chickens of the same history and past environment. Each such test group consisted of 30 birds which were seventeen days old. Twenty-four hours after the initiation of the diets, 150,000 sporulated *Eimeria tenella* oöcysts were introduced directly into the crops of the birds. Simultaneously with the initiation of the diets and from the fourth through the tenth day thereafter, the birds were weighed and the average weight per bird for each test group determined. All birds which died were autopsied to ascertain whether death was due to coccidiosis. The results of this experiment are shown in the following table.

| Percent by Weight of 3,5-Dinitro-2-methylbenzamide in Feed | Average Weight Per Bird in Grams on Day Indicated After Diet Began | | | | | | | | Percent Mortality From Coccidiosis |
|---|---|---|---|---|---|---|---|---|---|
| | 0 | 4 | 5 | 6 | 7 | 8 | 9 | 10 | |
| 0.0125 | 101 | 140 | 149 | 159 | 166 | 176 | 192 | 204 | 0 |
| 0.015 | 98 | 139 | 148 | 160 | 169 | 179 | 197 | 210 | 0 |
| Infected Control | 99 | 139 | 146 | 147 | 138 | 141 | 157 | 170 | 56 |
| Uninfected Control | 100 | 140 | 148 | 161 | 171 | 185 | 203 | 216 | 0 |

*Example 5*

Mash compositions were prepared as described in Example 4 containing various amounts of 3,5-dinitro-2-methylbenzamide. These medicated feed compositions and unmodified poultry mash were fed as a sole ration to groups of 15 chickens each having the same history and past environment. All the chickens were seventeen days old. Twenty-four hours after the initiation of the diets 50,000 *Eimeria necatrix* oöcysts were introduced directly into the crops of the birds. The average weight of each bird was recorded upon the initiation of the diet and on the fourth through the tenth day thereafter. The percent by weight of active agent in the diet, the average weight per bird in each test group and the mortality from coccidiosis are shown in the following table.

| Percent by Weight of 3,5-Dinitro-2-methylbenzamide in Feed | Average Weight Per Bird in Grams on Day Indicated After Diet Began | | | | | | | | Percent Mortality From Coccidiosis |
|---|---|---|---|---|---|---|---|---|---|
| | 0 | 4 | 5 | 6 | 7 | 8 | 9 | 10 | |
| 0.025 | 107 | 147 | 158 | 167 | 177 | 188 | 196 | 207 | 0 |
| 0.01 | 107 | 149 | 162 | 173 | 184 | 196 | 208 | 224 | 0 |
| 0.005 | 106 | 152 | 163 | 175 | 186 | 195 | 207 | 222 | 0 |
| Infected Control | 107 | 153 | 161 | 153 | 147 | 129 | 132 | 147 | 73 |
| Uninfected Control | 108 | 152 | 163 | 175 | 186 | 200 | 211 | 223 | 0 |

*Example 6*

A dispersible concentrate of 3,5-dinitro-2-methylbenzamide prepared as described in Example 1 was dispersed in a commercial poultry mash to produce medicated feed compositions containing 0.015 percent and 0.01 percent of 3,5-dinitro-2-methylbenzamide. These medicated feed compositions and unmodified poultry mash were fed as a sole ration to flocks of White Rock chickens of the same history and past environment. Each flock consisted of 81 cockerels and 81 pullets which were one day old. The flocks were kept in separate rearing pens and maintained upon cane litter in accordance with sanitary poultry practices. Upon the 23rd day following initiation of the diets, all the birds were fed a mash heavily inoculated with the sporulated oöcysts of *Eimeria tenella* and *Eimeria necatrix*. The inoculated ration was fed in an amount sufficient to provide 150,000 oöcysts per bird. Following the feeding of the inoculated ration, any of the birds which died were autopsied and the cause of death determined. Eight weeks after the initiation of the diets, the birds were weighed and the average weight per bird for each test flock determined. The nature of the diets, the average weights of the birds and the mortality figures are set forth in the following table.

| Percent by weight of 3,5-dinitro-2-methyl-benzamide in feed | Average weight per bird in grams after 8 weeks | Percent mortality due to Coccidiosis |
| --- | --- | --- |
| 0.015 | 942.5 | 0 |
| 0.01 | 954.5 | 1.2 |
| Unmedicated checks | 898.0 | 12.3 |

Example 7

Ninety parts by weight of 3,5-dinitro-4-methoxy-benzamide, 3,5-dinitro-4-propylbenzamide, 4,6-dinitro-2-methoxy-benzamide or N-ethyl-3,5-dinitro-4-ethylbenzamide are mechanically ground with bentonite to produce parasiticidal concentrates containing 90 percent by weight of one of the benzamide compounds.

In a similar manner, medicated feed supplements are prepared by grinding together 50 parts N,N-diisopropyl-3,5-dinitro-2-methylbenzamide, 4,6-dinitro-3-ethylbenzamide, N-methyl-3,5-dinitro-2-propoxy-benzamide or N-methyl-4,6-dinitro-2-methylbenzamide with 1 part of a sorbitan monopalmitate (Span 20) and 49 parts of attapulgite clay.

In another operation, 20 parts by weight of N-methyl-2,4,6-trinitrobenzamide is mechanically mixed with 80 parts of soybean meal to prepare a medicated animal feed concentrate.

In still another operation, 10 parts by weight of N-ethyl-4,6-dinitro-2-propylbenzamide, N-allyl-2,4-dinitrobenzamide or N,N-dimethyl-2,4-dinitrobenzamide are dispersed in 90 parts of cottonseed oil to prepare edible oil concentrate compositions containing one of the benzamide compounds.

These compositions are adapted to be administered to animals to supply the desired internal dosage of polynitrobenzamide compound or to be employed as concentrates and subsequently diluted with additional edible carriers to produce animal feeds containing the desired amount of active agent.

Example 8

The 3,5-dinitro-2-methylbenzamide concentrate as described in Example 1 was dispersed in a commercial poultry mash to prepare medicated feed compositions containing various amounts of said compound. These compositions and unmodified mash were fed as a sole food ration to groups of chickens of the same history and environment. Each such test group consisted of 100 White Rock cockerels and 100 White Rock pullets which were one day old. The groups were maintained on wire in heated steel cages and under conventional sanitary poultry practices to minimize the possibility of exposure to coccidial infection. Just prior to the initiation of the diets and four weeks and eight weeks thereafter, the birds were weighed and the average weight per bird for each test group determined. During the eight weeks period, a record was kept of the feed consumed by each test group. The average weight per bird for the test groups and the feed efficiency factor are set forth in the following table.

The feed efficiency factor is the number of grams of feed eaten per gram of body weight gained.

| Percent by weight of 3,5-Dinitro-2-Methylbenzamide in Mash | Average Weight Per Bird in Grams at the indicated intervals following initiation of The Diets | | | Feed Efficiency Factor |
| --- | --- | --- | --- | --- |
| | 0 Weeks | 4 Weeks | 8 Weeks | |
| 0.00 | 44.0 | 382.6 | 1201.7 | 2.48 |
| 0.15 | 43.5 | 382.0 | 1216.7 | 2.38 |
| 0.175 | 43.8 | 402.6 | 1229.0 | 2.36 |
| 0.02 | 42.9 | 402.6 | 1213.4 | 2.32 |
| 0.0225 | 42.7 | 397.5 | 1198.5 | 2.34 |

Example 9

3,5-dinitro-2-methylbenzamide was dispersed in a commercial pig feed to prepare medicated feed compositions containing from 0.01 to 0.03 percent of said compound. These compositions and the unmodified feed were fed as a sole food ration to groups of pigs of the same history and environment. Each such test group consisted of five young pigs having an average weight of 24 pounds. These pigs were maintained on the experimental diets for a period of ten weeks after which time they were again weighed to determine which group had gained the most weight. The results of this experiment are recorded in the table below.

| Percent by Weight of 3,5-Dinitro-2-Methylbenzamide in Pig Feed | Average Weight in Pounds of Each Pig After 10 Weeks on Diet |
| --- | --- |
| 0.00 | 110.0 |
| 0.01 | 131.8 |
| 0.02 | 132.5 |
| 0.03 | 127.4 |

Example 10

Twenty-five parts by weight of various polynitrobenzamides were separately ground with 75 parts of fuller's earth to prepare dispersible concentrates containing only one of said compounds. A portion of each of these compositions was dispersed in a commercial poultry mash to produce medicated feed compositions containing various amounts of one of the test compounds. These compositions and unmodified mash were fed as a sole feed ration to groups of chickens of the same history. Each test group consisted of three chickens which were seventeen days old. One day after the diets were begun, from 30,000 to 100,000 sporulated *Eimeria necatrix* oöcysts were introduced directly into the crop of the birds. Another group of birds was left untreated and uninoculated to serve as an uninfected check. Seven days following the initiation of the diets, the birds were sacrificed, autopsied and an examination made to determine the percent control of coccidial disease. The percent by weight of each compound in the feed and the percent control of coccidiosis are shown in the following table.

| Benzamide Agent Employed | Percent by Weight of Agent in Feed | Percent Control of Coccidiosis |
| --- | --- | --- |
| 3,5-Dinitro-4-Methyl- | 0.1 | 100 |
| 3,5-Dinitro-2-Ethyl- | 0.05 | 100 |
| | 0.03 | 96 |
| 3,5-Dinitro-2-Methoxy- | 0.05 | 100 |
| 2,4,6-Trinitro- | 0.1 | 88 |
| 4,6-Dinitro-3-Methyl- | 0.05 | 92 |
| N-Allyl-3,5-Dinitro-2-Methyl- | 0.05 | 100 |
| 2,4-Dinitro- | 0.1 | 88 |
| 3,5-Dinitro-4-Amino- | 0.1 | 100 |
| Infected Checks | 0 | (1) |
| Unifected checks | 0 | (2) |

[1] All birds heavily infected with coccidial disease.
[2] No coccidial disease.

The polynitrobenzamides as employed in accordance with the present invention are crystalline solids which are somewhat soluble in many organic solvents and of very low solubility in water. The 2,4,6-trinitrobenzamides, 3,5-dinitrobenzamides and 2- and 4-alkyl-3,5-dinitrobenzamides may be prepared by the reaction of 2,4,6-trinitrobenzoic acid, 3,5-dinitrobenzoic acid or a 2- or 4-alkyl-3,5-dinitrobenzoic acid with thionyl chloride ($SOCl_2$) or phosphorus pentachloride to produce the corresponding acid chlorides. The acid chlorides are then reacted with at least 2 moles of aqueous ammonia or a suitable amine per mole of acid chloride to obtain the desired polynitrobenzamide or N-substituted polynitrobenzamide compounds.

The 4,6-dinitrobenzamides and 2- or 3-alkyl-4,6-dinitrobenzamides may be prepared by diazotization of 4,6-dinitroaniline or a 2- or 3-alkyl-4,6-dinitroaniline to form the corresponding diazonium salt which is then reacted with cuprous or nickelous cyanide to obtain the corresponding nitrile. Subsequent hydrolysis of the nitrile results in the formation of the corresponding polynitrobenzoic acid. The acid is then reacted with thionyl chloride to obtain the acid chloride which is reacted with ammonia or a suitable amine to produce the desired benzamide compound.

In an alternative procedure, the 2- or 3-methyl-4,6-dinitrobenzamides may be prepared by oxidizing 1,2-dimethyl-4,6-dinitrobenzene or 1,3-dimethyl-4,6-dinitrobenzene with dilute nitric acid whereby the 2- or 3-methyl-4,6-dinitrobenzoic acids are produced. The latter acids may be treated as previously described to obtain the desired benzamide compounds.

The 2- or 4-amino-3,5-dinitrobenzamides are prepared by the nitration of 2-chlorobenzoic acid or 4-chlorobenzoic acid to obtain the corresponding 3,5-dinitro-chlorobenzoic acids which are then reacted with phosphorus pentachloride to form the corresponding acid chlorides. These acid chlorides are then reacted with aqueous ammonia or a suitable amine in the proportion of two moles of ammonia or amine per mole of acid chloride. Since the acyl chlorine is more reactive than the ring chlorine, such reaction results in the formation of 2- or 4-chloro-3,5-dinitrobenzamides or N-substituted 2- or 4-chloro-3,5-dinitrobenzamides. The latter benzamide compounds thereafter may be reacted with excess alcoholic ammonia to replace the ring chlorine and obtain the desired 2- or 4-amino-3,5-dinitrobenzamide compounds.

The 2-amino-4,6-dinitrobenzamides may be prepared by the reduction of 2,4,6-trinitrobenzamide with sodium sulfhydrate (NaSH), whereby the ortho nitro group is selectively reduced to an amino group.

The 2-or 4-alkoxy-3,5-dinitrobenzamides may be prepared by the reaction of a 2- or 4-chloro-3,5-dinitrobenzamide or an N-substituted-2- or 4-chloro-3,5-dinitrobenzamide with an alkali metal alkoxide whereby an alkoxy group is substituted for chlorine in the 2- or 4-chloro-3,5-dinitrobenzamide compound.

The 2- or 3-alkoxy-4,6-dintrobenzamides or N-substituted-2- or 3-alkoxy-4,6-dinitrobnzamides may be prepared by the diazotization of a 2- or 3-alkoxy-4,6-dinitroaniline to form the corresponding diazonium salt which is then reacted with cuprous or nickelous cyanide to obtain the corresponding nitrile. The nitrile is thereafter hydrolyzed to the corresponding benzoic acid, the benzoic acid converted to the acid chloride and the acid chloride reacted with ammonia or an amine as previously described to obtain the desired benzamide compounds.

We claim:
1. In the practice of animal husbandry, the method which comprises orally administering to animals a compound having the formula

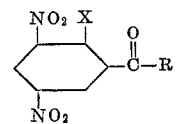

wherein R represents a radical selected from the group consisting of amino, monomethylamino, dimethylamino, monoethylamino, diethylamino, propylamino and dipropylamino, and X represents a member of the group consisting of methyl and ethyl, said compound being employed daily in an amount of from 3 to 2,000 milligrams per kilogram of body weight.

2. A method claimed in claim 1 wherein the polynitrobenzamide compound is fed daily in an amount of from 3 to 250 milligrams per kilogram of body weight.

3. A method claimed in claim 1 wherein the polynitrobenzamide compound is 3,5-dinitro-2-methylbenzamide.

4. A method claimed in claim 1 wherein the polynitrobenzamide compound is N-isopropyl-3,5-dinitro-2-methylbenzamide.

5. A method claimed in claim 1 wherein the polynitrobenzamide compound is N-methyl-3,5-dinitro-2-methylbenzamide.

6. A poultry feed containing from 0.001 to 0.1 percent by weight of 3,5-dinitro-2-methylbenzamide.

7. A poultry feed containing from 0.001 to 0.1 percent by weight of N-methyl-3,5-dinitro-2-methylbenzamide.

8. A method which comprises feeding an animal a composition comprising as an active ingredient a compound corresponding to the formula

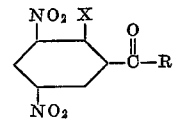

wherein R represents a radical selected from the group consisting of amino, monomethylamino, dimethylamino, monoethylamino, diethylamino, propylamino and dipropylamino, and X represents a member of the group consisting of methyl and ethyl, in intimate admixture with an inocuous ingestible adjuvant, the composition being fed in an amount sufficient to provide a daily dosage of from 3 to 2,000 milligrams of said compound per kilogram of body weight.

9. An animal feed containing from 0.001 to 0.1 percent by weight of a compound corresponding to the formula

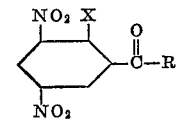

wherein R represents a radical selected from the group consisting of amino, monomethylamino, dimethylamino, monoethylamino, diethylamino, propylamino and dipropylamino, and X represents a member of the group consisting of methyl and ethyl.

References Cited in the file of this patent

Thompson: Chem. Abst., vol. 41, 1947, pages 3902, 3903, 3909i.